United States Patent [19]
Smith et al.

[11] Patent Number: 5,833,795
[45] Date of Patent: Nov. 10, 1998

[54] MAGNETIC PARTICLE INTEGRATED ADHESIVE AND ASSOCIATED METHOD OF REPAIRING A COMPOSITE MATERIAL PRODUCT

[75] Inventors: Michael Roy Smith, Florissant; Kevin Dale Walters, St. Charles, both of Mo.

[73] Assignee: McDonnell Douglas Corporation, St. Louis, Mo.

[21] Appl. No.: 718,192

[22] Filed: Sep. 19, 1996

[51] Int. Cl.$^6$ ........................................ B32B 31/28
[52] U.S. Cl. ........................ 156/272.4; 156/275.7; 219/710; 219/759
[58] Field of Search .................. 156/272.2, 272.4, 156/275.7, 307.7, 330; 219/710, 759, 634

[56] References Cited

U.S. PATENT DOCUMENTS

| | | | |
|---|---|---|---|
| 4,626,642 | 12/1986 | Wang et al. | |
| 4,878,978 | 11/1989 | Goel et al. | |
| 4,912,594 | 3/1990 | Bannink, Jr. et al. | |
| 4,944,185 | 7/1990 | Clark, Jr. et al. | |
| 5,086,149 | 2/1992 | Baron et al. | 528/45 |
| 5,391,595 | 2/1995 | Clark et al. | 156/272.4 |
| 5,553,504 | 9/1996 | Lyons et al. | 73/799 |

OTHER PUBLICATIONS

W.G. Clark, Jr., Magnetic Tagging Monitors Bond Integrity And Thickness, *Adhesives Age*, Jun. 1992, pp. 22–26.
PCT International Search Report, PCT/US97/16529, Jan. 30, 1998.

*Primary Examiner*—Michael W. Ball
*Assistant Examiner*—Michael A Tolin
*Attorney, Agent, or Firm*—Bell Seltzer Intellectual Property Group of Alston & Bird, LLP

[57] ABSTRACT

A method of repairing a composite material product by adhering a repair patch to the composite material product with an adhesive or epoxy resin that includes magnetic particles. Thus, the adhesive or epoxy resin can be cured by electromagnetically exciting the magnetic particles, such as by microwave heating. The electromagnetically excited magnetic particles internally heat the adhesive or epoxy resin to the predetermined Curie Point temperature of the magnetic particles such that the adhesive or epoxy resin cures in a uniform and inspectable fashion. The magnetic particles can be mixed into an adhesive, such as a paste adhesive, a film adhesive or a foam adhesive, to create a magnetic particle integrated adhesive. The magnetic particle integrated adhesive can then be applied between a precured repair patch and the underlying composite material product. Alternatively, the magnetic particles can be distributed within the organic resin of an uncured repair patch such that the repair patch can be simultaneously cured and adhered to the composite material product by electromagnetically exciting the magnetic particles. In either embodiment, the adhesive or the epoxy resin is adapted to cure within a predetermined range of cure temperatures. Thus, the magnetic particles, such as Ferrous Silicide, should have a predetermined Curie Point temperature within the predetermined range of cure temperatures.

17 Claims, 2 Drawing Sheets

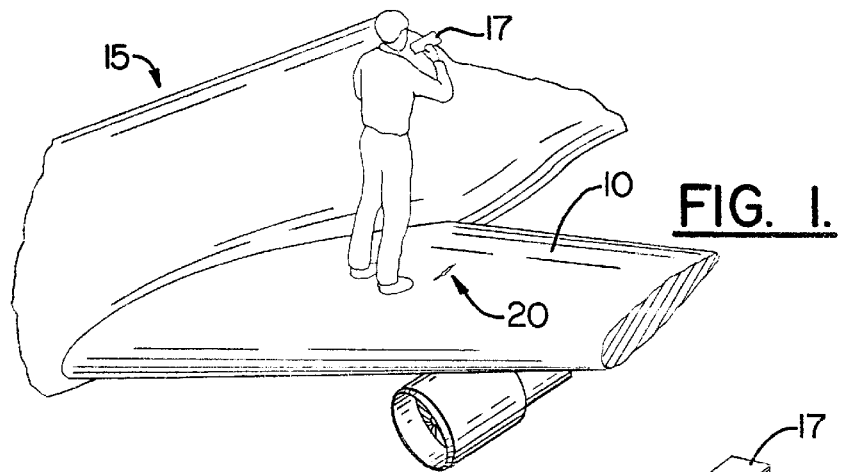
FIG. 1.
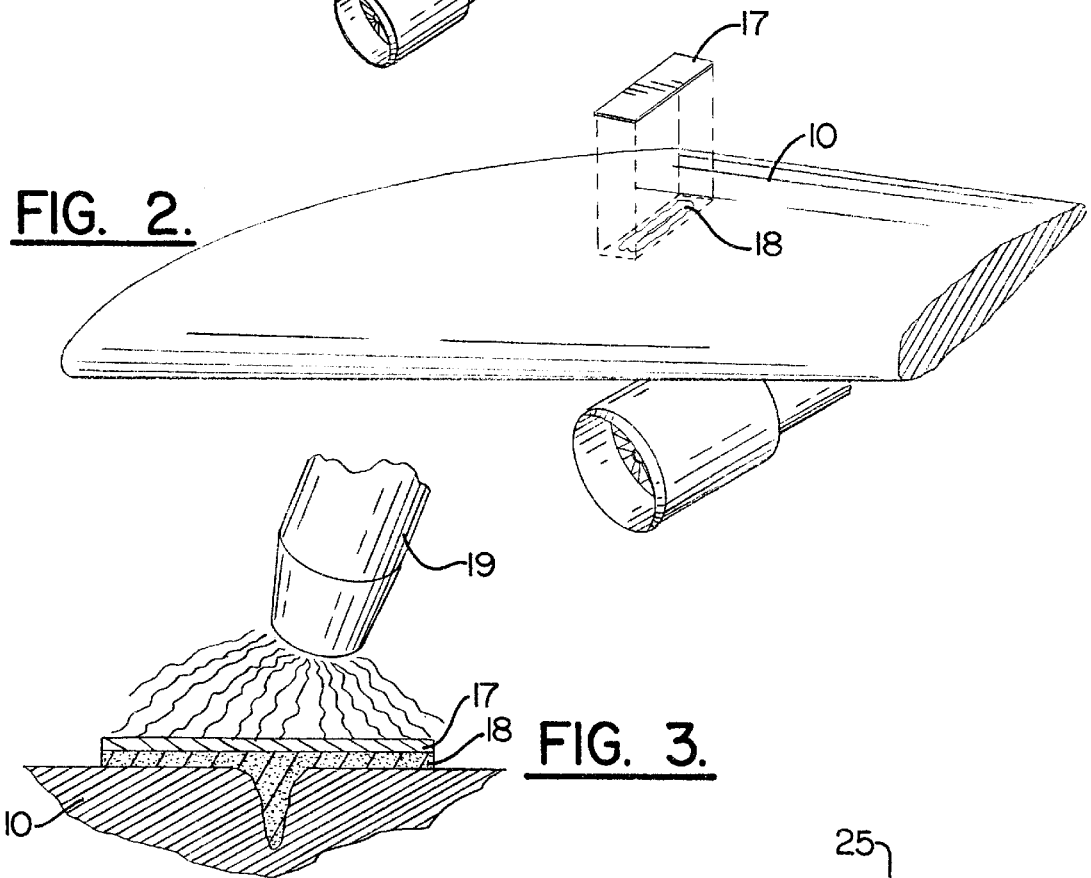
FIG. 2.
FIG. 3.
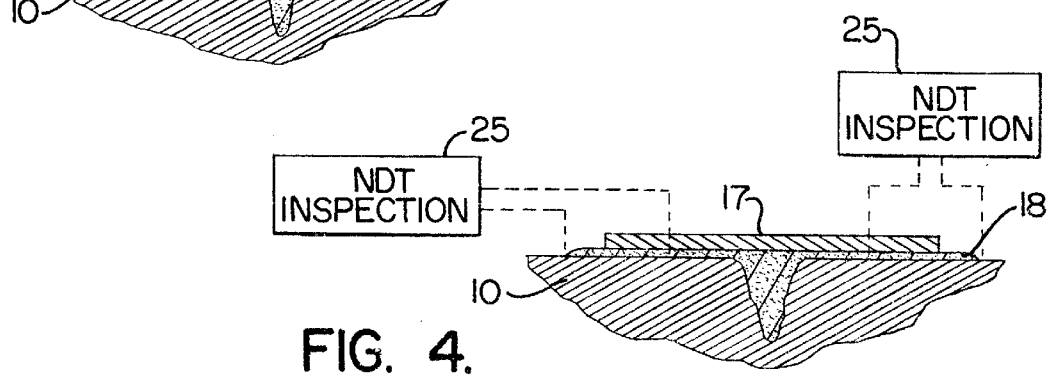
FIG. 4.

MAGNETIC PARTICLE INTEGRATED ADHESIVE AND ASSOCIATED METHOD OF REPAIRING A COMPOSITE MATERIAL PRODUCT

FIELD OF THE INVENTION

The present invention relates generally to the repair of structural components and, more specifically, to magnetic particle integrated adhesives for repairing composite and metallic material products, such as the skin of an aircraft.

BACKGROUND OF THE INVENTION

Since the weight of an aircraft is a major design parameter, many modern aircraft employ lightweight composite materials that now have the capability to perform in applications traditionally dedicated to metallic components. For example, the outer surface of some modern aircraft is typically covered with composite laminates which form a "skin" over the underlying structure. The skin is exposed to many hazards such as rain, ice, heat, birds, service equipment and maintenance personnel. The stress imparted during flight as well as the stress imparted by these hazards can weaken portions of the skin or can even puncture holes in the skin that must be repaired to prevent the propagation of these structural defects.

The "on-aircraft" repair of the composite skin of an aircraft can be a difficult environment in which to effect a repair. The large unwieldy structure, the configuration of the repair area, potentially inhospitable service conditions as well as access limitations preventing the use of factory or manufacturing equipment can make field service repairs very difficult. Thus, ease, reliability, portable process tooling and inspectability are desired characteristics of all aircraft field repair processes.

Regardless of the environment, the repair of structural defects, such as structural defects in the skin of an aircraft, is preferably performed in a reliable and controlled manner to insure effective structural restoration (repairs). For example, repairs to the skin of an aircraft are typically performed by bonding a repair patch with an adhesive to the affected area, such as a portion of the wing surface. As will be apparent, these repairs are difficult because it is nearly impossible to recreate the factory conditions under which composite skin structures are fabricated. For example, autoclaves are used in the factory to impart a strong compressive force and consistent heating temperature during the curing cycle of the composite layers.

In the field, in place of an autoclave, a heating blanket is placed over the repair area to heat and, therefore, cure the adhesive. Preferably, a vacuum bag is also placed over the heating blanket. The vacuum bag is operably connected to a vacuum controller which pulls a vacuum to exert pressure on the heating blanket and, in turn, the underlying repair patch in an attempt to remove air/solvent pockets from the bond lines during the heat/cure cycle.

The heating blanket has discrete electrical heating paths winding up and down the blanket. As a result, the heating blanket has cold and hot spots which may differ in temperature by as much as 50° F., thereby providing uneven heating to the repair patch. Additionally, the wing skin can have an uneven thickness which further hinders the even heat transfer to the repair patch and, more particularly, to the adhesive. The uneven distribution of heat and the differing skin material thickness inhibits the adhesive from curing at an even rate and introduces the potential for undesirable bonding irregularities which fail to conform to acceptable aircraft structural restoration standards. In addition, the heating blanket typically covers not only the repair patch, but also adjacent portions of the aircraft skin. As a result, the heating blanket can overheat these adjacent areas, resulting in disbonds or delaminations of a previously undamaged structure.

Regardless of the method of repair, it is desirable to perform any needed repairs in such a way so that the repaired area can be inspected by non-destructive evaluation methods ("NDE"); also known as non-destructive inspection or testing ("NDI/NDT") methods. Examples of NDE include ultrasonic inspection, radiographic inspection (x-ray), fluorescent penetrant inspection ("FPI"), magnetic particle inspection ("MPI"), eddy current inspection and the like. These inspection techniques allow for the inspection of the repaired part or joint without degrading the integrity of the underlying material, bond or joint.

The term "joint" refers to where two pieces of material are joined, conventionally by any number of joining techniques such as by welding, brazing, adhesive bonding, and the like. Acceptable joints are typically defined by a specified number of flaws within a specified area of the part. For example, criteria such as the number of inclusions, voids, porosity and the like are described in industry standards commonly known as military specifications ("Mil-Specs") or military standards ("Mil-Stds") which define acceptable levels of porosity and inclusions depending on the particular application of the joint. In particular, these industry standards generally define greater requirements, such as Cl-A, Cl-B, etc., for more highly stressed joints. In order for the NDE to be effective, the NDE must accurately indicate the flaws in the joint boundary. Certain of the NDE techniques are preferred over others depending on several different inspection parameters.

NDE techniques have been reliably employed to inspect metallic parts and joints since metal structures have bright lines of demarcation when subjected to NDE methods. Depending upon the selected method of NDE, these bright lines can distinctly indicate flaws, inclusions, porosity and voids in the metallic structure which can then be repaired prior to further structural weakening or structural failure.

Even though NDE methods have been reliably employed in the aircraft industry in conjunction with metallic structures for many years, NDE techniques have not been as effective on composite materials. In particular, NDE of composite materials is generally less reliable than the NDE of metallic parts since composite materials are not conductive and do not typically provide the same lines of demarcation which indicate imperfections as are found in metallic parts. Thus, it may be difficult to insure that the resulting adhesive/composite bond or joint meets the necessary industry (FAA or Military) standards.

In response to this perceived problem, U.S. Pat. No. 4,944,185 which was issued to Clark, Jr. et al. (hereinafter "the Clark '185 patent") and is entitled "System and Method For Qualitatively and Nondestructively Inspecting Adhesive Joints and Other Materials" proposes using magnetic tagging ferrite particles in an adhesive to facilitate the inspection of bond integrity and thickness. However, the Clark '185 patent does not address the curing of the adhesive or the deficiencies in conventional curing techniques, such as the overexposure due to heating of adjacent structural components or the uneven heat distribution provided by a heating blanket.

OBJECTS AND SUMMARY OF THE INVENTION

It is therefore an object of the present invention to provide an improved bond between a repair patch and an underlying composite laminate structure.

It is a further object of the present invention to bond a repair patch to an underlying composite laminate structure without heating or otherwise damaging adjacent portions of the composite laminate structure.

These and other objects are provided, according to one embodiment of the present invention, by a magnetic particle integrated adhesive for adhering a repair patch to a composite material product in need of repair, and an associated method of repairing the composite material product. The magnetic particle integrated adhesive preferably includes an adhesive, such as a paste adhesive, a film adhesive or a foam adhesive, and a plurality of magnetic particles. The adhesive is adapted to cure within a predetermined range of cure temperatures, while the magnetic particles, such as Ferrous Silicide particles, have a predetermined Curie Point temperature within the predetermined range of cure temperatures of the adhesive.

Once the magnetic particle integrated adhesive of this embodiment has been applied between the repair patch and the portion of the composite material product in need of repair, the magnetic particle integrated adhesive is cured to bond the patch to the composite material product to provide a structurally restored joint. According to one advantageous aspect of the present invention, the magnetic particle integrated adhesive is cured by electromagnetically exciting the magnetic particles within the magnetic particle integrated adhesive to thereby internally heat the magnetic particle integrated adhesive to a predetermined temperature, such as the predetermined Curie Point temperature, for a predetermined time. For example, the magnetic particles can be electromagnetically excited by subjecting the magnetic particle integrated adhesive to microwave energy. According to this aspect of the present invention, the curing process can be further controlled by monitoring the temperature of the magnetic particle integrated adhesive and controlling the electromagnetic excitement of the magnetic particles based upon the temperature of the magnetic particle integrated adhesive.

According to an alternative embodiment, the present invention can provide a repair patch which has not been cured, but which includes a plurality of magnetic particles. As a result, the repair patch of this embodiment can be concurrently cured and adhered to an underlying composite material product in need of repair. In addition to magnetic particles, such as Ferrous Silicide particles, the repair patch of this embodiment includes an organic resin, such as an epoxy resin, a bismalemide resin or a polyimide resin, in which the magnetic particles are mixed. The repair patch of this embodiment also includes a plurality of reinforcing fibers, such as carbon fibers, graphite fibers, boron fibers or silicon carbide fibers. The repair patch of this embodiment is applied to the composite material product as an uncured preimpregnated composite ply. By thereafter electromagnetically exciting the magnetic particles within the repair patch, such as by subjecting the repair patch to microwave energy, the repair patch can be internally and locally heated to thereby cure the repair patch and to concurrently bond the repair patch to the underlying composite material product.

Since the repair patch and/or the magnetic particle integrated adhesive is cured by electromagnetically exciting the magnetic particles which, in turn, internally heats the repair patch and/or the magnetic particle integrated adhesive, the repair patch is locally heated. As a result, adjacent portions of the composite material product are not subjected to heat and, therefore, are not subjected to reheating or overheating which may structurally degrade those adjacent portions. In addition, since the magnetic particles are mixed relatively evenly throughout the repair patch and/or the magnetic particle integrated adhesive, the electromagnetic excitement of the magnetic particles provides for even heating such that the repair patch and/or the magnetic particle integrated adhesive cures consistently and uniformly regardless of the structural heat sink configuration in the patch vicinity and in marked contrast to conventional repair methods. Further, since the resulting cured joint includes the magnetic particles, typically up to about 20% by volume, the resulting cured joint can be readily inspected via non-destructive evaluation or testing (NDE/NDT) to ensure that the cured joint meets industry standards.

BRIEF DESCRIPTION OF THE DRAWINGS

FIG. 1 is a perspective view of a composite laminate structure, i.e., the wing of an aircraft, in need of repair.

FIG. 2 is a perspective view of a magnetic particle integrated adhesive disposed between a compatible repair patch and a composite material product in need of repair according to one embodiment of the present invention.

FIG. 3 illustrates a fragmentary cross-sectional side view which has been enlarged for purposes of illustration and which depicts a microwave heating source for internally activating and locally curing a magnetic particle integrated adhesive according to one embodiment of the present invention.

FIG. 4 illustrates the NDE of a resulting bonded joint according to one embodiment of the present invention.

DETAILED DESCRIPTION OF THE PREFERRED EMBODIMENTS

Figure 5:
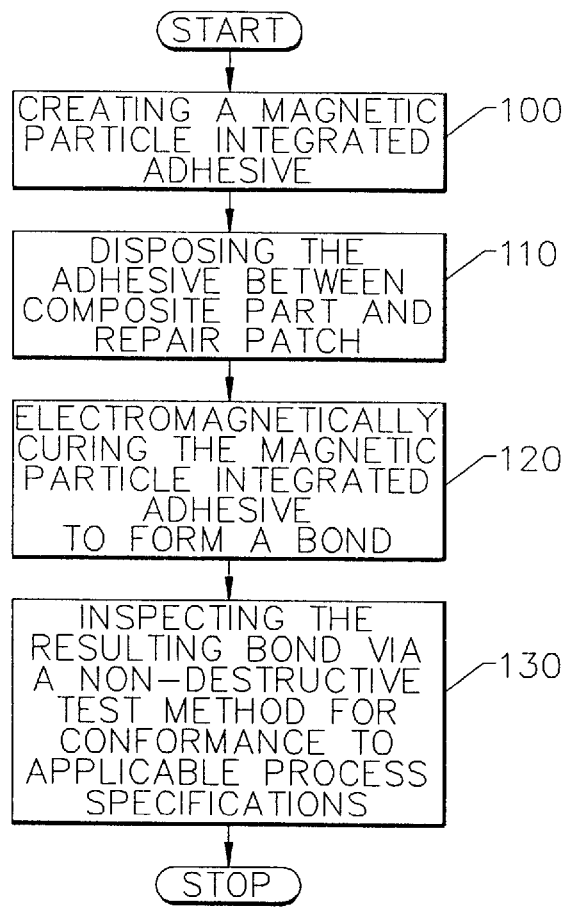
FIG. 5 is a flow chart of the operations performed in repairing and curing a joint according to one embodiment of the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, applicants provide these embodiments so that this disclosure will be thorough and complete, and will fully convey the scope of the invention to those skilled in the art. Like numbers refer to like elements throughout.

As illustrated in FIGS. 1 and 2, the composite laminate skin 10 of an aircraft 15 can be repaired by initially sizing a compatible material patch 17 which will be placed over the area in need of repair 20. The patch material is preferably formed of the same material as the underlying part in need of repair, such as the composite laminate skin of an aircraft wing. For example, the composite laminate skin material is typically a carbon fiber and epoxy matrix. Therefore, the preferable repair patch for this particular application would also be formed of a carbon fiber and epoxy matrix. However, it will be appreciated by those of skill in the art that the invention is not limited thereto and includes any number of equivalent composite laminate materials capable of providing the functional characteristics and structural integrity necessary for the application.

In one advantageous embodiment, the repair patch 17 has a diameter of about six inches and a thickness of about 0.030 inches. However, the dimensions of the repair patch can vary depending on the specific repair. Further, it is generally preferred that the repair patch not include any right angles or sharp edges, but, instead, the repair patch preferably includes rounded or blended angles and edges to prevent stress risers. In addition, larger repair patches are generally subjected to more severe stress. Therefore, additional care should be taken to ensure that these larger patches are properly bonded to the underlying structure.

According to one embodiment of the present invention, the patch 17 is precured and is bonded to the composite product 10, such as the aircraft wing, with a magnetic particle integrated adhesive 18. While the repair patch can include the magnetic particle integrated adhesive as described below, the magnetic particle integrated adhesive of one embodiment is separate from the repair patch as shown in FIG. 2. The magnetic particle integrated adhesive of this embodiment can be formed, as described below and as shown in block 100 of FIG. 5, from the mixture of an adhesive and a plurality of magnetic particles. The adhesive of one advantageous embodiment is a paste adhesive (single or multi-component mix) approved for aircraft repairs. One example of an acceptable and commercially available paste adhesive is Dexter Hysol EA9394. This type of adhesive has a first part which includes resin components and a second part which includes catalyst components. As known to those skilled in the art, when the various parts of the adhesive are combined, the parts react to create an adhesive. The magnetic particles are preferably added to the adhesive with or close in time to the addition of the catalyst in order to provide a more even distribution or integration of the magnetic particles within the resulting magnetic particle integrated adhesive.

The adhesive need not be a paste adhesive and can, instead, be a film adhesive or a foam adhesive, for example. According to one advantageous embodiment, the magnetic particle integrated adhesive 18 is a film adhesive, such as a FM300 film adhesive, which has been impregnated with magnetic particles.

Regardless of the type of adhesive, the magnetic particle integrated adhesive 18 of this embodiment has a predetermined cure temperature or predetermined range of cure temperatures depending, at least in part, upon the other process parameters. For the reasons described below, the magnetic particles preferably have a Curie Point temperature which is within the predetermined range of cure temperatures.

During the curing of the magnetic particle integrated adhesive 18 as described below, the magnetic particles within the adhesive mixture are electromagnetically excited. Based upon this electromagnetic excitement, the magnetic particles internally heat the magnetic particle integrated adhesive until the magnetic particle integrated adhesive reaches the Curie Point temperature of the magnetic particles at which point the temperature stabilizes as a result of the molecular phase change of the magnetic particles from the ferroelectric phase to the paraelectric phase. Thus, the magnetic particles preferably have a predetermined Curie Point temperature which is within the predetermined range of cure temperatures for the magnetic particle integrated adhesive.

As described above, the magnetic particle integrated adhesive 18 typically has a cure temperature of about 250° F.±10° F. Thus, one preferred magnetic particle includes Ferrous Silicide (FeSi) which has a predetermined Curie Point temperature when mixed with the adhesive which falls within the predetermined range of cure temperatures of the adhesive mixture. While FeSi is particularly advantageous for the curing of magnetic particle integrated adhesives with the aforementioned cure temperatures, other ferrites can be employed to cure magnetic particle integrated adhesives that have other cure temperatures without departing from the spirit and scope of the present invention.

The magnetic particles are preferably added to the adhesive in an amount which is less than about 20% by volume of the total magnetic particle integrated adhesive. For example, one advantageous magnetic particle integrated adhesive 18 includes 15% of magnetic particles by volume. While increasing amounts of magnetic particles improve the curing and inspection properties of the magnetic particle integrated adhesive, the increased amounts of magnetic particles disadvantageously increases the weight and may disadvantageously decrease the strength of the resulting joint. Therefore, a desirable magnetic particle integrated adhesive will balance these countervailing properties to tailor the magnetic particle integrated adhesive to meet the requirements of a particular application.

As known to those skilled in the art, the cure temperature of the resulting magnetic particle integrated adhesive 18 will be impacted by several process parameters. For example, the magnetic particle type and concentration, the energy source, and the power level and signal wavelength/frequency emitted by the energy source all impact the cure temperature of the magnetic particle integrated adhesive. In particular, the frequency of the signals emitted by the energy source may impact the cure temperature because the propagation of the signals into the magnetic particle integrated adhesive and composite material will vary based upon the frequency of the signals. Therefore, a process evaluation should be performed to define an appropriate power vs. temperature cure cycle for each adhesive magnetic particle integrated repair process. In addition, the frequency should be adjusted to allow the lowest power setting for a given temperature.

One exemplary magnetic particle integrated adhesive 18 includes 15% by volume of FeSi magnetic particles which are added to the EA9394 adhesive. This exemplary magnetic particle integrated adhesive can be cured according to the present invention by applying microwave energy at 500–750 W for about 1–2 hours which serves to heat the repair area to about 250° F. Advantageously, the repair method and magnetic particle integrated adhesive of this embodiment can yield a bond line having a constant thickness with improved permeability and conductivity so as to enhance the inspectability of the resulting bond line.

According to another embodiment of the present invention, the repair patch 17 is not precured. As a result, the repair patch can include an organic resin which serves as an adhesive to bond the repair patch to the composite material product 10 as the repair patch is cured. The repair patch of this embodiment also includes a plurality of reinforcing fibers disposed within the resin to thereby form a preimpregnated composite ply adapted to cure within a predetermined range of cure temperatures. According to this embodiment, the repair patch also includes a plurality of magnetic particles disposed within the organic resin along with the reinforcing fibers. As described above in conjunction with a magnetic particle integrated adhesive 18, the plurality of magnetic particles preferably have a predetermined Curie Point temperature within the predetermined range of cure temperatures, such that the preimpregnated composite ply can be cured by electromagnetically exciting the plurality of magnetic particles to thereby adhere the repair patch to the composite material product.

As described above, the repair patch 17 can include a variety of magnetic particles without departing from the spirit and scope of the present invention so long as the magnetic particles have a Curie Point temperature within the predetermined range of cure temperatures of the preimpregnated composite ply. However, the magnetic particles of one advantageous embodiment are ferrite particles and, more preferably, FeSi particles which account for less than about 20% and, more preferably, about 15% by volume of the organic resin. As described above, the amount of magnetic particles can be varied depending upon the other process parameters without departing from the spirit and scope of the present invention.

In addition, while the repair patch 17 can include a variety of organic resins, the organic resin of one advantageous embodiment is selected from the group consisting of epoxy resins, bismalemide resins and polyimide resins. In addition, while the reinforcing fiber can be comprised of a variety of materials, the reinforcing fibers of one advantageous embodiment are selected from the group consisting of carbon fibers, graphite fibers, boron fibers and silicon carbide fibers. Typically, the reinforcing fibers and organic resin of the repair patch of this aspect of the present invention are selected to match the reinforcing fibers and organic resin, respectively, of the underlying composite material product 10. If desired, however, the repair patch can include other types of reinforcing fibers and organic resins without departing from the spirit and scope of the present invention.

According to either embodiment, a microwave heater 19 is employed to heat the repair patch 17 and/or the magnetic particle integrated adhesive 18 to the appropriate cure temperature such that the repair patch is bonded to the underlying composite structure 10, as illustrated by FIG. 3. In one exemplary embodiment, the wattage of the microwave heater is maintained at 500–750 W, although the microwave heater can operate at lower power levels if desired. Preferably, the microwave heater includes a hand held or fixedly mounted lead or protective shield to protect the environment and the repair personnel from excessive microwave emissions.

The microwave heater 19 heats the repair patch 17 and/or the magnetic particle integrated adhesive 18 by electromagnetically exciting the magnetic particles therein. The electromagnetically excited magnetic particles then heat the adhesive within the magnetic particle integrated adhesive or the organic resin within the repair patch to the predetermined Curie Point temperature at which point the temperature stabilizes. Since the electromagnetic excitement of the magnetic particles heats the repair patch and/or the magnetic particle integrated adhesive internally, the microwave heater does not unnecessarily heat and, therefore, damage the surrounding composite structure. Preferably, a thermocouple or other sensor provides system feedback to a controller which adjusts and limits the energy provided by the microwave heater such that a more constant and even heat distribution within the repair patch and/or magnetic particle integrated adhesive can be provided to the joint while providing any temperature profile required for the specific repair procedure.

In operation, the method and apparatus of the present invention preferably employs microwave energy to heat magnetic particles to a stable Curie Point temperature sufficient to cure the repair patch 17 and/or the magnetic particle integrated adhesive 18. The heat produced is internally generated by the electromagnetically excited magnetic particles. As a result, the heating is localized which should substantially eliminate any overbaking or other unnecessary heat exposure of the surrounding structure. Additionally, the magnetic particles are distributed uniformly throughout the bond line which provides for uniform heating of the repair patch and/or the magnetic particle integrated adhesive and permits the resulting joint to be more easily inspected due to the increased permeability and conductivity (both thermal and electrical) of the cured repair patch and/or magnetic particle integrated adhesive. Thus, the resulting joint can be inspected by NDE techniques 25, such as eddy current inspection.

As shown in FIG. 2 and in block 110 of FIG. 5, the magnetically integrated adhesive 18 of one embodiment of the present invention is applied between the skin 10 and the repair patch 17. The magnetic particle integrated adhesive should be somewhat evenly distributed in an amount sufficient to prevent voids due to lack of material in the bond line of the joint. Alternatively, if the magnetic particles are distributed within the organic resin of the preimpregnated composite ply which will form the repair patch, the repair patch is applied directly to the skin. According to either embodiment, a compressive force is then preferably applied to the repair patch during the bonding/curing cycle in order to minimize or eliminate the formation of voids or porosity in the bond lines. The compressive force can be applied during the cure cycle in a number of manners, such as by placing a portable vacuum bag over the repair patch and pulling a vacuum in the bag with vacuum pressure equipment operably connected to the vacuum bag. Preferably, the vacuum pressure equipment pulls a sufficient vacuum within the bag to apply a compressive force on the repair patch and the underlying composite layers such that air/solvent pockets in the repair patch and/or magnetic particle integrated adhesive are removed, thereby minimizing void formation during the cure cycle.

After the cure cycle is complete and the repair patch 17 is bonded to the composite laminate, the joint can be inspected with known NDE techniques 25 as illustrated by FIG. 4 and blocks 120 and 130 of FIG. 5. For example, an eddy current inspection method can be employed to identify disruptions or discontinuities in the electrical path defined by the magnetic particles in the bonded joint. As known to those skilled in the art, an electrical discontinuity or a disruption in the joint may indicate an imperfection or defect in the bond line of the joint. However, other NDE techniques may also be employed to inspect the bond line, including, but not limited to, ultrasound, x-ray, MPI and FPI.

In order to illustrate the method for repairing a composite material product with a precured repair patch 17 and a magnetic particle integrated adhesive 18, the following example is provided. In this example, FeSi particles are mixed into EA9394 adhesive, such that the FeSi particles comprise 10% by volume of the resulting magnetic particle integrated adhesive. The resulting magnetic particle integrated adhesive is then applied to a thickness of 5 mils between an AS4/977-3 carbon epoxy workpiece 10 and an AS4/977-3 carbon epoxy repair patch which was 0.084 inches in thickness. A vacuum bag was placed over the repair patch and the repair patch and the underlying magnetic particle integrated adhesive were subjected to microwave energy in order to electromagnetically excite the magnetic particles. The magnetic particle integrated adhesive was cured for two hours at a temperature of 250° F. as monitored by a J-type thermocouple.

In order to demonstrate the detection of defects, such as delaminations, within a cured joint, flat bottom holes having a diameter of ½ inch were machined into the rear surface of the workpiece 10. In particular, one flat bottom hole extended only slightly into the workpiece and did not enter the cured joint. However, the other hole extended through the workpiece, through the cured magnetic particle integrated adhesive 18 and into the repair patch 17. Both holes were then detected with a Nortec NDT-19 eddy current instrument having an SPO-2288 reflection probe operating at 50 kilohertz. As set forth above, the foregoing example is provided to illustrate one embodiment of the present invention and should not be construed as limiting thereof.

Since the repair patch 17 and/or the magnetic particle integrated adhesive mixture 18 are cured by electromagnetically exciting the magnetic particles which, in turn, internally heat the repair patch and/or the magnetic particle integrated adhesive, the repair patch is locally heated. As a result, adjacent portions of the composite material product 10 are not subjected to heat and, therefore, are not baked or otherwise structurally degraded. In addition, since the magnetic particles are mixed relatively evenly throughout either the magnetic particle integrated adhesive or the preimpregnated composite ply, the electromagnetic excitement of the magnetic particles provides for even heating such that the repair patch and/or the magnetic particle integrated adhesive cures consistently and uniformly. Further, since the resulting cured joint includes the magnetic particles, typically up to about 20% by volume, the resulting cured joint can be readily inspected via non-destructive evaluation or testing (NDE/NDT) 25 to ensure that the cured joint meets industry standards.

The foregoing is illustrative of the present invention and is not to be construed as limiting thereof. The invention is defined by the following claims, with equivalents of the claims to be included therein.

That which is claimed is:

1. A method for repairing a composite material product comprising the steps of:
   providing a magnetic particle integrated adhesive comprising an adhesive and a predetermined amount of magnetic particles;
   applying the magnetic particle integrated adhesive between a repair patch and a portion of the composite product in need of repair;
   curing the magnetic particle integrated adhesive to bond the repair patch to the composite product to provide a cured joint, wherein said curing step comprises electromagnetically exciting the magnetic particles to thereby internally heat the magnetic particle integrated adhesive to a predetermined temperature for a predetermined time;
   monitoring the temperature of the magnetic particle integrated adhesive during said step of electromagnetically exciting the magnetic particles; and
   controlling the electromagnetic excitement of the magnetic particles based upon the temperature of the magnetic particle integrated adhesive.

2. A method according to claim 1 wherein said electromagnetically exciting step comprises the step of subjecting the magnetic particle integrated adhesive to microwaves to thereby locally heat the magnetic particle integrated adhesive.

3. A method according to claim 1 further comprising a step of selecting magnetic particles which have a predetermined Curie Point temperature sufficient to cure the magnetic particle integrated adhesive, wherein said selecting step precedes said providing step.

4. A method for repairing a composite material product comprising the steps of:
   providing a magnetic particle integrated adhesive comprising an adhesive and a predetermined amount of magnetic particles, wherein said providing step comprises selecting Ferrous Silicide (FeSi) particles to create the magnetic particle integrated adhesive, wherein the FeSi particles have a predetermined Curie Point temperature sufficient to cure the magnetic particle integrated adhesive;
   applying the magnetic particle integrated adhesive between a repair patch and a portion of the composite product in need of repair; and
   curing the magnetic particle integrated adhesive to bond the repair patch to the composite product to provide a cured joint, wherein said curing step comprises electromagnetically exciting the magnetic particles to thereby internally heat the magnetic particle integrated adhesive to a predetermined temperature for a predetermined time.

5. A method according to claim 1 further comprising a step of selecting an adhesive from a group consisting of film adhesives, foam adhesives and paste adhesives.

6. A method according to claim 4 wherein said electromagnetically exciting step comprises the step of subjecting the magnetic particle integrated adhesive to microwaves to thereby locally heat the magnetic particle integrated adhesive.

7. A method according to claim 4 further comprising a step of selecting an adhesive from a group consisting of film adhesives, foam adhesives and paste adhesives.

8. A method for repairing a composite material product comprising the steps of:
   providing a repair patch and a magnetic particle integrated adhesive comprising an adhesive and a predetermined amount of magnetic particles;
   applying the repair patch and the magnetic particle integrated adhesive to a portion of the composite product in need of repair;
   curing the magnetic particle integrated adhesive to bond the repair patch to the composite product, wherein said curing step comprises electromagnetically exciting the magnetic particles to thereby internally heat the magnetic particle integrated adhesive to a predetermined temperature for a predetermined time;
   monitoring the temperature of the magnetic particle integrated adhesive during said step of electromagnetically exciting the magnetic particles; and
   controlling the electromagnetic excitement of the magnetic particles based upon the temperature of the magnetic particle integrated adhesive.

9. A method according to claim 8 wherein said electromagnetically exciting step comprises the step of subjecting the magnetic particle integrated adhesive to microwaves to thereby locally heat the magnetic particle integrated adhesive.

10. A method according to claim 8 further comprising a step of selecting magnetic particles which have a predetermined Curie Point temperature sufficient to cure the magnetic particle integrated adhesive, wherein said selecting step precedes said providing step.

11. A method according to claim 8 wherein the magnetic particle integrated adhesive is separate from the repair patch, and wherein the method further comprises the steps of:
   selecting an adhesive from a group consisting of film adhesives, foam adhesives and paste adhesives; and
   applying the magnetic particle integrated adhesive between the repair patch and the portion of the composite product in need of repair.

12. A method according to claim 8 wherein the repair patch is impregnated with the magnetic particle integrated adhesive, and wherein said providing step comprises providing a repair patch comprising an organic resin, a plurality of reinforcing fibers and a plurality of magnetic particles.

13. A method for repairing a composite material product comprising the steps of:

providing a repair patch and a magnetic particle integrated adhesive comprising an adhesive and a predetermined amount of magnetic particles, wherein said providing step comprises selecting Ferrous Silicide (FeSi) particles to create the magnetic particle integrated adhesive which have a predetermined Curie Point temperature sufficient to cure the magnetic particle integrated adhesive;

applying the repair patch and the magnetic particle integrated adhesive to a portion of the composite product in need of repair; and curing the magnetic particle integrated adhesive to bond the repair patch to the composite product, wherein said curing step comprises electromagnetically exciting the magnetic particles to thereby internally heat the magnetic particle integrated adhesive to a predetermined temperature for a predetermined time.

14. A method according to claim 13 wherein said electromagnetically exciting step comprises the step of subjecting the magnetic particle integrated adhesive to microwaves to thereby locally heat the magnetic particle integrated adhesive.

15. A method according to claim 13 further comprising the steps of:

monitoring the temperature of the magnetic particle integrated adhesive during said step of electromagnetically exciting the magnetic particles; and controlling the electromagnetic excitement of the magnetic particles based upon the temperature of the magnetic particle integrated adhesive.

16. A method according to claim 13 wherein the magnetic particle integrated adhesive is separate from the repair patch, and wherein the method further comprises the steps of:

selecting an adhesive from a group consisting of film adhesives, foam adhesives and paste adhesives; and applying the magnetic particle integrated adhesive between the repair patch and the portion of the composite product in need of repair.

17. A method according to claim 13 wherein the repair patch is impregnated with the magnetic particle integrated adhesive, and wherein said providing step comprises providing a repair patch comprising an organic resin, a plurality of reinforcing fibers and a plurality of magnetic particles.

* * * * *

UNITED STATES PATENT AND TRADEMARK OFFICE
CERTIFICATE OF CORRECTION

PATENT NO. : 5,833,795

DATED : November 10, 1998

INVENTOR(S) : Smith et al.

It is certified that error appears in the above-identified patent and that said Letters Patent is hereby corrected as shown below:

In the References Cited, U.S. PATENT DOCUMENTS, line 6, "Clark et al." should read --Clark, Jr. et al.--.

In the References Cited, add:

--FOREIGN PATENT DOCUMENTS

| | | |
|---|---|---|
| 1095174A | 4/1989 | Japan |
| 6055474A | 5/1981 | Japan--. |

Signed and Sealed this

Ninth Day of March, 1999

*Attest:*

*Attesting Officer*

Q. TODD DICKINSON

*Acting Commissioner of Patents and Trademarks*